United States Patent [19]

Maru

[11] Patent Number: 5,349,698
[45] Date of Patent: Sep. 20, 1994

[54] RADIO COMMUNICATION SYSTEM FOR A SELECTED ONE OF A PLURALITY OF TERMINAL UNITS OF DIFFERENT KINDS

[75] Inventor: Tsuguo Maru, Tokyo, Japan

[73] Assignee: NEC Corporation, Japan

[21] Appl. No.: 985,510

[22] Filed: Dec. 2, 1992

Related U.S. Application Data

[63] Continuation of Ser. No. 633,673, Dec. 26, 1990, abandoned.

[30] Foreign Application Priority Data

Dec. 26, 1989 [JP] Japan .................. 1-335167

[51] Int. Cl.⁵ .............................................. H04B 1/16
[52] U.S. Cl. .................... 455/89; 455/200.1; 455/234.2; 455/349; 379/61; 379/420
[58] Field of Search ............ 455/89, 40, 349, 343, 455/127, 234.1–234.2, 33.1, 79, 200.1; 379/61, 58, 63, 420, 424

[56] References Cited

U.S. PATENT DOCUMENTS

| | | | |
|---|---|---|---|
| 3,803,366 | 4/1974 | Ishii et al. | 379/61 |
| 4,680,787 | 7/1987 | Marry | 379/63 |
| 4,718,080 | 1/1988 | Serrano et al. | 379/59 |
| 4,847,887 | 7/1989 | Suzuki et al. | 379/59 |
| 4,897,864 | 1/1990 | Murata et al. | 379/61 |
| 4,924,193 | 5/1990 | Saito et al. | 330/284 |
| 5,008,953 | 4/1991 | Dahlin et al. | 455/33.1 |
| 5,095,541 | 3/1992 | Aisaka et al. | 455/343 |

FOREIGN PATENT DOCUMENTS

3737647  5/1989  Fed. Rep. of Germany.

Primary Examiner—Reinhard J. Eisenzopf
Assistant Examiner—Chi Pham
Attorney, Agent, or Firm—Ostrolenk, Faber, Gerb & Soffen

[57] ABSTRACT

In a radio communication apparatus which is capable of using a selected terminal unit selected from a plurality of terminal units, a logic part detects the kind of the selected terminal unit to produce a type signal representative of the selected kind. Responsive to the type signal, the logic part controls an adjusting part which produces an adjusted signal. As a result, the adjusted signal has a selected level which is selected for the selected terminal unit in accordance with the type signal. Responsive to the adjusted signal, the selected terminal unit generates an audible signal having a volume which is adjusted in accordance with the selected level. Additionally, the volume can be manually adjusted by an operator.

22 Claims, 3 Drawing Sheets

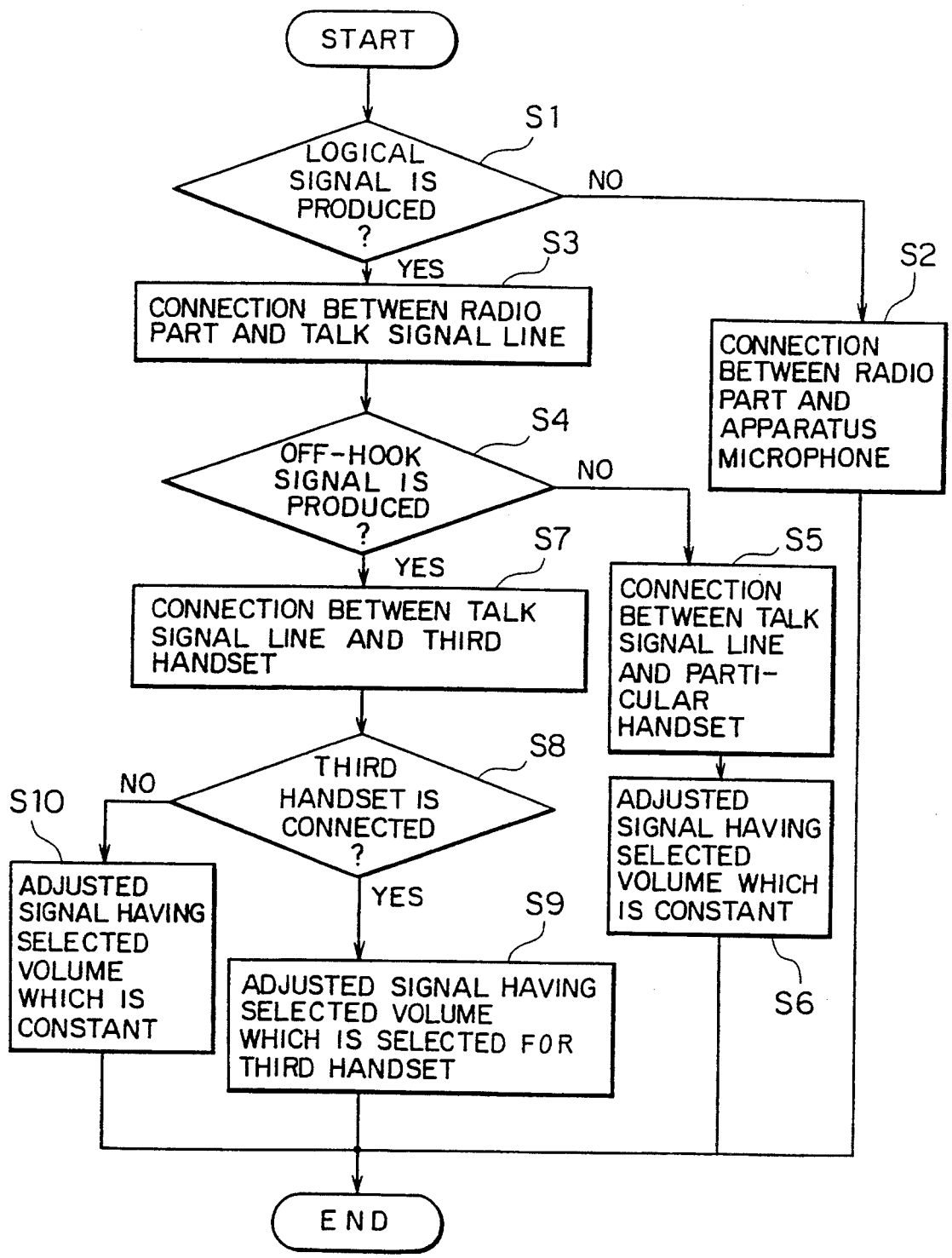
F I G. 4

RADIO COMMUNICATION SYSTEM FOR A SELECTED ONE OF A PLURALITY OF TERMINAL UNITS OF DIFFERENT KINDS

This is a continuation of U.S. application Ser. No. 07/633,673, filed on Dec. 26, 1990, now abandoned.

BACKGROUND OF THE INVENTION

The present invention relates to a radio communication apparatus, such as a telephone set, for use in combination with a terminal unit.

A recent technical development has brought about a telephone set which has various user interface functions. In one of the user interface functions, the telephone set is used in combination with a selected terminal unit which is selected from a plurality of terminal units of different kinds and is of a selected kind. The telephone set includes a receiving part for receiving a radio signal to produce a received signal and an adjusting part for adjusting the received signal to produce an adjusted signal. The selected terminal unit is provided with an ear piece receiver or an announcing unit for providing an announce signal by generating an audible signal having an adjustable volume which can be adjusted in accordance with the adjusted signal.

Various handsets of different kinds have been developed as the terminal units for the telephone set. A handset of a first one of the kinds comprises a control unit for producing an announce control signal which can be adjusted in response to operation of a volume key. Responsive to the announce control signal, the telephone set controls the audible signal. It is necessary for the first kind of handset that the adjusted signal has a first selected level.

Another handset of a second kind is provided with an adjustable volume member for adjusting the volume of the audible signal independently of the telephone set and is inexpensive. It is necessary for the second kind that the adjusted signal have a second selected level which is different from the first selected level.

In addition, it is possible to use, as the selected terminal unit, a handset which comprises a loudspeaker. When this handset is used as the selected terminal unit, it is unnecessary in carrying out communication for an operator to hold the handset with his hands, the so-called "hands free" type device. In this event, it is necessary that the adjusted signal have a third selected level which is different from each of the first and the second selected levels.

Accordingly, it is desired that the adjusted signal be automatically adjusted to have a level which is suitable for the selected terminal unit.

SUMMARY OF THE INVENTION

It is an object of the present invention to provide a radio communication apparatus which is capable of interfacing a selected terminal unit selected from a plurality of terminal units of different kinds.

It is another object of this invention to provide a radio communication apparatus of the type described, wherein an adjusted signal is automatically adjusted to have a level which is suitable for the selected terminal unit.

Other objects of this invention will become clear as the description proceeds.

The above and other objects of the present invention are achieved by a radio communication apparatus for use in combination with a selected terminal unit which is selected from a plurality of terminal units of different kinds and is of a selected kind, the radio communication apparatus including receiving means for receiving a radio signal to produce a received signal and adjusting means for adjusting the received signal to produce an adjusted signal.

According to this invention, the above-understood radio communication apparatus comprises detecting means for detecting the selected kind to produce a type signal representative of the selected kind and control means connected to the adjusting means and the detecting means for controlling the adjusting means to make the adjusted signal have a selected level which is selected for the selected terminal unit in accordance with the type-signal.

Other features and advantages of the present invention will become apparent from the following description of the invention which refers to the accompanying drawings.

BRIEF DESCRIPTION OF THE DRAWINGS

FIG. 4 is a flow chart for use in describing operation of the radio communication apparatus illustrated in FIG. 3.

DETAILED DESCRIPTION OF THE DRAWING(S)

Figure 1:
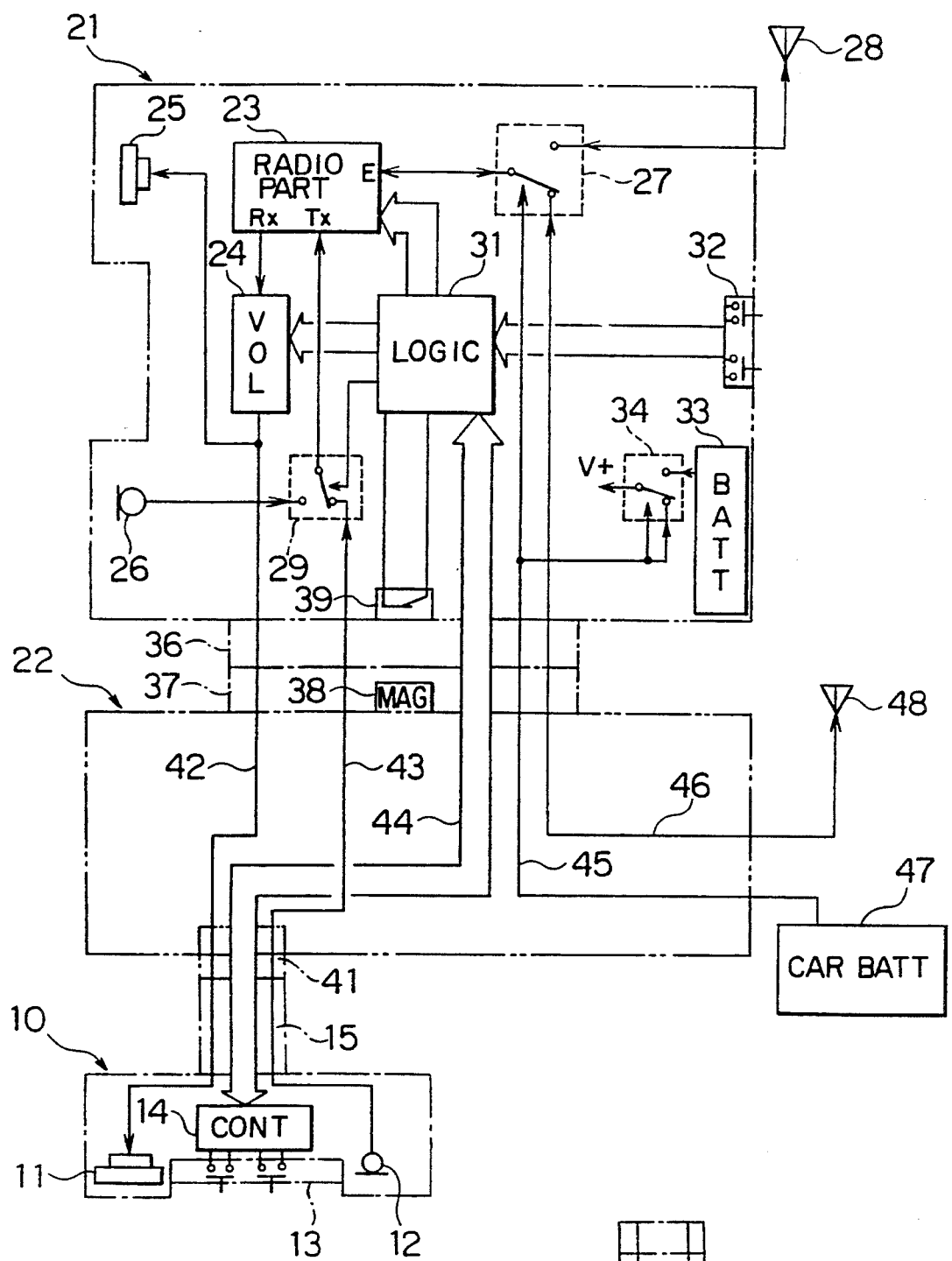
FIG. 1 shows, together with a handset of a first kind, a radio communication apparatus according to a first embodiment of this invention.

Referring to FIG. 1, a radio communication apparatus according to an embodiment of this invention is carried as a mobile telephone set in an automobile or the like and is for use in combination with a first handset 10 which is selected as a selected terminal unit from a plurality of handsets of different kinds and which is of a first kind. The description will be made at first with regard to the first handset 10. The first handset 10 comprises an ear piece receiver or a handset announcing unit 11, a handset microphone 12, a handset volume key 13, a handset control circuit 14, and a handset connector 15. The control circuit 14 is labelled CONT in the figure.

The announcing unit 11 is for providing a handset announce signal by generating an audible signal having an adjusted signal which will later become clear. The microphone 12 is for producing an audible frequency signal as a main talk signal and is referred to as a main producing arrangement. The main talk signal is representative of the speech of an operator or user of the radio communication apparatus. The volume key 13 is operated by the operator for producing a handset key signal which is representative of the fact that the volume key 13 is operated by the operator. Supplied with the key signal, the control circuit 14 produces a handset announce control signal which is for determining the volume of the audible signal. The handset connector 15 is for mechanically and electrically connecting the first handset 10 to the radio communication apparatus.

The following description will be directed to the radio communication apparatus. The radio communication apparatus comprises first and second units 21 and 22. The first unit 21 is a portable telephone set and comprises a radio part 23, an adjusting part 24, an apparatus announcing unit 25, and an apparatus microphone 26. The adjusting part 24 is labelled VOL in the figure.

The radio part 23 is a receiving arrangement for receiving a radio signal and has a radio signal terminal E connected through an antenna selection switch 27 to an antenna 28 which will be called a subsidiary antenna hereafter. Supplied with the radio signal, the radio part 23 produces a received signal. The adjusting part 24 is connected to a received signal terminal Rx of the receiving part 24 for adjusting the received signal into an adjusted signal. The announcing unit 25 is connected to the adjusting part 24. Responsive to the adjusted signal, the announcing unit 25 provides an apparatus announce signal by generating an audible signal having an adjustable volume like the handset announcing unit 11.

The apparatus microphone 26 is for producing an audible frequency signal as a subsidiary talk signal and is referred to as a subsidiary producing arrangement. The subsidiary talk signal is representative of the speech of the operator like the handset microphone 12. The talk signal is sent to a talk signal terminal Tx of the radio part 23 through a microphone selection switch 29. Responsive to the talk signal, the radio part 23 transmits a transmission signal to the subsidiary antenna 28 through the antenna selection switch 27.

The first unit 21 further comprises a logic part 31, an apparatus volume key 32, and an apparatus power source 33. The volume key 32 consists of an upper and a lower part. The logic part 31 is labelled LOGIC in the figure. The apparatus power source 33 is labelled BATT in the figure.

The logic part 31 is connected to each of the radio and the adjusting parts 23 and 24 and is for carrying out operation which will later be described in detail. The volume key 32 is connected to the logic part 31 and is operated by the operator for producing an apparatus key signal like the handset key switch 13. The key signal is sent to the logic part 31. The upper part of the apparatus volume key 32 is for raising the adjustable volume. The lower part is for lowering the adjustable volume. It may be mentioned here that the handset volume key 13 is of similar structure. The power source 33 is for supplying apparatus electric power through a power selection switch 34 to a first unit power line which is connected to various portions of the first unit 21 in a manner known in the art.

The first and the second units 21 and 22 are provided with first and second connectors 36 and 37, respectively, and are removably connected to each other by fitting the first and the second connectors 36 and 37 together.

For detecting connection between the first and the second units 21 and 22, the radio communication apparatus comprises a permanent magnetic member 38 and an apparatus reed switch 39 which are placed in the second and the first units 22 and 21, respectively.

The permanent magnetic member 38 is labelled MAG in the figure and is for generating a magnetic field and is referred to as a generating arrangement. The reed switch 39 is for producing a logical signal when it is placed in the magnetic field with the first unit 21 connected to the second unit 22. Herein, the reed switch 39 is referred to as a local producing arrangement. The logical signal is sent to the logic part 31.

The description will now be directed to the second unit 22. The second unit 22 is provided with an additional connector 41 which is removably connected to the handset connector 15 of the first handset 10.

The second unit 22 comprises an adjusted signal line 42, a talk signal line 43, and an announce control signal line 44. The adjusted signal line 42 connects the handset announcing unit 11 of the first handset 10 to the adjusting part 24 through the first and second connectors 36 and 37, the additional connector 41, and the handset connector 15. The talk signal line 43 connects the handset microphone 12 of the first handset 10 to the microphone selection switch 29 through the first and second connector 36 and 37, the additional connector 41, and the handset connector 15. As a result, the talk signal terminal Tx of the radio part 23 is connected to a selected one of the handset and the apparatus microphones 12 and 26 when the microphone selection switch 29 is controlled by the logic part 31 as will later become clear.

The announce control signal line 44 connects the control unit 14 of the first handset 10 to the logic part 31 through the first and second connectors 36 and 37, the additional connector 41, and the handset connector 15. The announce control signal is sent from the control circuit 14 to the logic part 31 through the announce control signal line 44.

The second unit 22 further comprises an electric power line 45 and an antenna line 46. The electric power line 45 connects a main power source 47 of main electric power to each of the antenna selection and the power selection switches 27 and 34 through the first and the second connectors 36 and 37. The main power source 47 is labelled CAR BATT in the figure. The main power source 47 is fixedly mounted on the automobile and is removably connected to the electric power line 45.

The antenna line 46 connects a main antenna 48 to the antenna selection switch 27 through the first and second connectors 36 and 37. The main antenna 48 is fixedly mounted on the automobile and is removably connected to the antenna line 46.

In a case where the first unit 21 is connected to the second unit 22, and the second unit 22 to the main power source 47, the main electric power is supplied from the main power source 47 to each of the antenna selection and the power selection switches 27 and 34. In this event, the antenna selection and the power selection switches 27 and 34 have the conditions depicted in the figure. As a result, the main power source 47 is connected to the power line of the first unit 21 through the power selection switch 34 to supply the main electric power to the first unit power line. Simultaneously, the main antenna 48 is connected to the radio part 23 through the antenna selection switch 27. Therefore, the radio communication apparatus is capable of carrying out communication by the use of the main power source 47 and the main antenna 48.

When the first unit 21 is removed from the second unit 22, the main electric power is not supplied to each of the antenna selection and the power selection switches 27 and 34. In this event, the antenna selection and the power selection switches 27 and 34 have different conditions wherein the subsidiary antenna 28 and the apparatus power source 33 are connected to the first unit power line through the antenna selection and the power selection switches 27 and 34, respectively.

Figure 2:
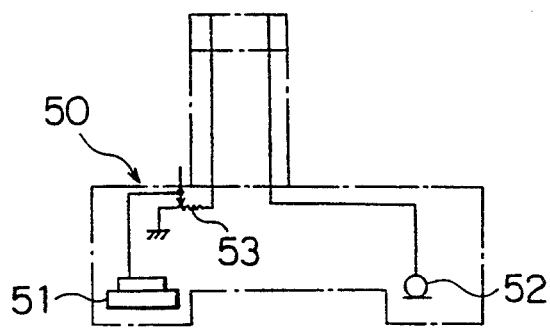
FIG. 2 is a schematic diagram of a handset of a second kind.

Although the description is made above in connection with a case where the first handset 10 is selected as the selected terminal unit, it is possible to select, in place of the first handset 10, a second handset 50 illustrated in FIG. 2.

The second handset 50 comprises, in addition to an ear piece receiver or a handset announcing unit 51 and a handset microphone 52, an adjustable volume member 53 connected to the announcing unit 51. The adjustable volume member 53 is operable by the operator for adjusting volume of an audible signal generated by the announcing unit 51. The adjustable volume member 53 is, for example, a variable resistor. In a case where the second handset 50 is connected to the second unit 22, it is possible to adjust the volume of the audible signal independently of the radio communication apparatus.

Although the figures do not show it, it is a matter of course that each of the first and the second handsets 10 and 50 further comprise a hook switch which is well-known in the art. In addition, the second unit 22 comprises a switch (not shown) which is inserted in the talk signal line 43 to close only when the hook switch is closed.

Figure 3:
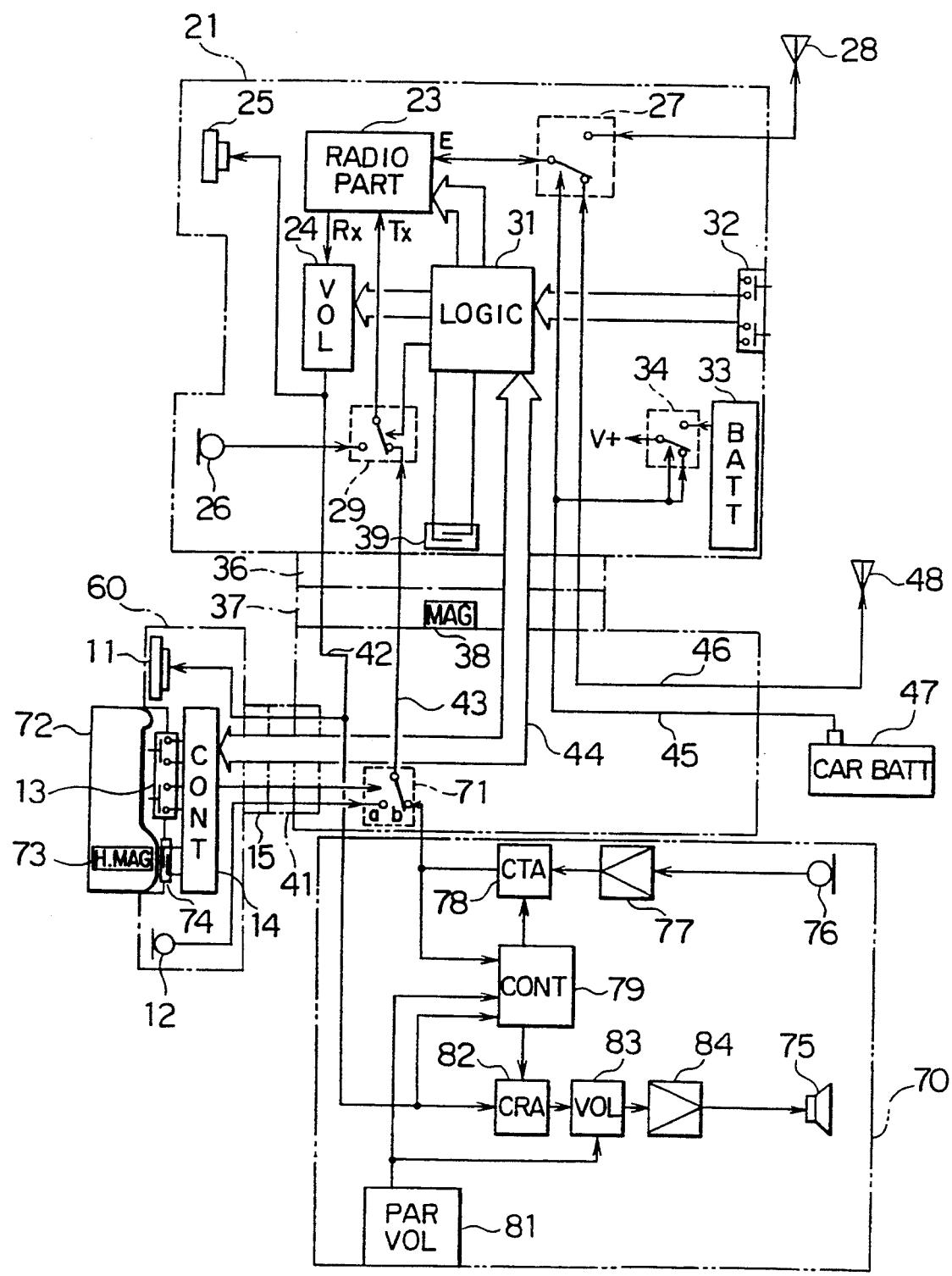
FIG. 3 shows, together with a third type handset, the radio communication apparatus illustrated in FIG. 1.

Referring to FIG. 3, the description will proceed to a case where third and fourth handsets 60 and 70 are connected to the radio communication apparatus. The communication apparatus comprises similar parts designated by like reference numerals. Each of the third and the fourth handsets 60 and 70 can be used by the operator as the selected terminal unit. The third handset 60 is removably connected to the second unit 22 through the handset and the additional connectors 15 and 41 like the first handset 10 illustrated in FIG. 1. Herein, the handset connector 15 is connected to the third handset 60 through a flexible handset cable (not shown). The handset 70 is directly connected to the second unit 22.

The second unit 22 comprises a handset selection switch 71 connected to the talk signal line 43. The handset selection switch 71 has first and second contact points a and b and connects the talk signal line 43 to a selected one of the third and the fourth handsets 60 and 70. Operation of the handset selection switch 71 is controlled in accordance with a handset selection signal which is sent from the third handset 60.

The third handset 60 is similar to the first handset 10 and comprises similar parts designated by like reference numerals. The third handset 60 further comprises a cradle 72 and a hook switch. The handset microphone 12 is connected to the first contact point a of the handset selection switch 71.

In this example, the hook switch comprises a handset permanent magnet 73 for generating a cradle magnetic field and a handset reed switch 74 placed in the handset magnetic field. The handset permanent magnet 73 is attached to the cradle 72. The handset permanent magnet 73 is labelled H.FLAG in the figure.

The third handset 60 is usually in contact with the cradle 72. The handset reed switch 74 is therefore placed in the cradle magnetic field. In this event, the handset selection switch 72 has the condition depicted in the figure. When the third handset 60 is removed from the cradle 72, the handset reed switch 74 is placed outside the cradle magnetic field. As a result, the handset reed switch 74 produces an off-hook signal. Supplied with the off-hook signal, the control circuit 14 produces the above-mentioned handset selection signal. In accordance with the handset selection signal, the handset selection switch 71 connects the talk signal line 43 to the handset microphone 12.

As will be understood from the above description, the handset microphone 12 produces the main talk signal in response to the speech of the operator. When the handset selection switch 71 connects the talk signal line 43 to the handset microphone 12, the main talk signal is set to the talk signal line 43 through the first contact point a of the handset selection switch 71.

The handset 70 is generally called a hands-free telephone set and comprises an ear piece receiver or an announcing unit 75 which is a loudspeaker well-known in the art. Therefore, it is unnecessary in carrying out communication for the operator to hold the handset 70 with the hands.

The handset 70 further comprises a microphone 76, a transmitting amplifier 77, a controllable transmission attenuator 78, a control circuit 79, a volume part 81, a controllable reception attenuator 82, an adjusting circuit 83, and a receiving amplifier 84. In the figure, the controllable transmission attenuator 78, the control circuit 79, the volume part 81, the controllable reception attenuator 82, and the adjusting circuit 83 are labelled CTA, CONT, PAR VOL, CRA, and VOL, respectively.

The second contact point b of the handset selection switch 71 is connected to the transmission attenuator 78. The adjusted signal line 42 is connected to each of the control circuit 79 and the controllable reception attenuator 82, irrespective of operation of the handset selection switch 71. Therefore, the adjusted signal is always supplied to each of the control circuit 79 and the controllable reception attenuator 82. When the handset 70 is used as the selected terminal unit, the handset selection switch 71 connects the talk signal line 43 to the handset 70 in accordance with the handset selection signal.

The microphone 76 is for producing an audible frequency signal as an original signal which is representative of the speech of the operator. The transmitting amplifier 77 is for amplifying the original signal into an amplified signal. With reference to a control signal which will later be described, the controllable transmission attenuator 78 controllably attenuates the amplified signal to produce a talk signal which is similar to the main talk signal. When the handset selection switch 71 connects the talk signal line 43 to the handset 70, the talk signal is sent to the talk signal line 43 through the second contact point b of the handset selection switch 71.

The volume part 81 is operated by the operator for producing an announce control signal in response to operation of the operator. The announce control signal is supplied to each of the control and the adjusting circuits 79 and 83. Responsive to the announce control, the talk signal, and the adjusted signals, the control circuit 79 produces the control signal to control operation of each of the controllable transmission and the controllable reception attenuators 78 and 82.

The controllable reception attenuator 82 is responsive to the control signal for controllably attenuating the adjusted signal into an attenuated signal. The adjusting circuit 83 is responsive to the announce control signal for adjusting the attenuated signal into an adjusted signal. The reception amplifier 84 is for amplifying the adjusted signal into an amplified signal. Responsive to the amplified signal, the announcing unit 76 generates an audible signal.

The description will now be directed to operation of the control circuit 79. In order to prevent the handset 70 from howling by acoustical and sidetone couplings, the control circuit 79 carries out comparison between the talk and the adjusted signals. When the talk signal is strong, the control circuit 79 makes the controllable transmission attenuator 78 greatly attenuate the amplified signal. This mode of operation of the control circuit 79 and the controllable transmission attenuator 78 will be called a reception mode. When the talk signal is weak, the particular control circuit 79 makes the controllable reception attenuator 82 greatly attenuate the adjusted signal. This mode of operation of the control circuit 79 and the controllable reception attenuator 82 will be called a transmission mode.

It will be assumed that the volume part 81 is operated to increase the volume of the audible signal. When the audible signal is too strong, the microphone 76 may pick up a part of the audible signal. As a result, the part of the audible signal is superposed on the original signal. In this event, the control circuit 79 makes the controllable transmission attenuator 78 greatly attenuate the amplified signal.

Referring to FIG. 4 together with FIG. 3, the description will proceed to the operation of the radio communication apparatus. At a first stage S1, the logic part 31 decides whether the logical signal is produced by the apparatus reed switch 39. When the logical signal is not produced by the reed switch 39, the first stage S1 is followed by a second stage S2 at which the logic part 31 makes the microphone selection switch 29 connect the radio part 23 to the apparatus microphone 26. In this condition, the adjusting part 24 can be controlled by the logic part 31 in accordance with the apparatus key signal to adjust the received signal into the adjusted signal. Responsive to the adjusted signal, the apparatus announcing unit 25 generates the audible signal. Therefore, it is possible to carry out communication by the use of the apparatus announcing unit 25 and the apparatus microphone 26.

When the logical signal is produced in the apparatus reed switch 39, the first stage S1 proceeds to a third stage S3 at which the logic part 31 processes the logical signal into a connection detection signal. In this manner, the logic part 31 serves as a processing arrangement. Responsive to the connection detection signal, the logic part 31 makes the microphone selection switch 29 connect the radio part 23 to the talk signal line 43. Herein, the logic part 31 may be referred to as a selecting arrangement.

The third stage S3 is followed by a fourth stage S4 at which the handset control circuit 14 decides whether the off-hook signal is produced in the third handset 60. When the off-hook signal is not produced, the fourth stage S4 proceeds to a fifth stage S5 at which the handset control circuit 14 makes the handset selection switch connect the talk signal line 43 to the handset 70.

The fifth stage S5 is followed by a sixth stage S6 at which the logic part 31 controls the adjusting part 24 to make the adjusted signal have a selected level which is constant. In this event, the volume of the audible signal can be adjusted by the volume part 81.

When the off-hook signal is produced in the third handset 60, the fourth stage S4 is followed by a seventh stage S7 at which the handset control circuit 14 makes the handset selection switch 71 connect the talk signal line 43 to the third handset 60.

The logic part 31 produces a request signal in response to the connection detection signal. The request signal is supplied to the handset control circuit 14. Responsive to the request signal, the handset control circuit 14 produces an acknowledge signal which is sent to the logic part 31. It is to be noted in this connection that the acknowledge signal is not sent to the logic part 31 when the second handset 50 (FIG. 2) is connected to the radio communication apparatus. This is because the second handset 50 does not comprise a handset control circuit 14.

The seventh stage S7 proceeds to an eighth stage S8. The logic part 31 carries out judgment whether or not the third handset 60 is connected to the radio communication apparatus with reference to the acknowledge signal. When the third handset 60 is connected, the logic part 31 detects the acknowledge signal. Otherwise, the logic part 31 does not detect the acknowledge signal. Responsive to the acknowledge signal, the logic part 31 produces a type signal which is representative of the selected kind. In this event, the logic part 31 is referred to as a detecting arrangement.

When the third handset 60 is connected to the radio communication apparatus, the eighth stage S8 proceeds to a ninth stage S9 at which the logic part 31 controls the adjusting part 24 to make the adjusted signal have a selected level which is selected for the third handset 60 in accordance with the type signal. In this event, it is possible to adjust the selected level by the volume key 13. Namely, the logic part 31 controls the adjusting part 24 to make the selected level be further adjusted in response to the handset announce control signal. The logic part 31 is referred to herein as a control arrangement.

When the third handset 60 is not connected to the radio communication apparatus, the eighth stage S8 is followed by a tenth stage S10 at which the logic part 31 controls the adjusting part 24 to make the selected level of the adjusted signal be constant. In a case where the selected level of the adjusted signal is constant, it is preferable to use the second handset 50 as the selected terminal unit. In this event, the volume of the audible signal can be adjusted by the adjustable volume member 53. Herein, the logic part 31 is referred to as an internal control arrangement.

While this invention has thus far been described in connection with only the preferred embodiment thereof, it will readily be possible for those skilled in the art to put this invention into practice in various other manners. For example, the radio communication apparatus may stationarily be installed, although the description is made with regard to an automobile or the like. It is a matter of course that another terminal unit may be used as the selected terminal unit.

What is claimed is:

1. A radio communication apparatus for use in combination with a selected terminal unit, the selected terminal unit being selected from a plurality of terminal units of different kinds, the selected terminal unit being a selected kind, said radio communication apparatus including receiving means for receiving a radio signal to produce a received signal and adjusting means for adjusting said received signal to produce an adjusted signal, said radio communication apparatus comprising:

detecting means for detecting the kind of said selected terminal unit from among the different kinds and for producing a type signal representative of the selected kind; and control means coupled to said adjusting means and said detecting means for controlling said adjusting means to make said adjusted signal have a selected level which is appropriate for said selected terminal unit in accordance with said type signal, said selected terminal unit comprising one of a hands-free terminal unit, a terminal unit having a control unit responsive to said control means and further being responsive to a manually operated volume control and a terminal unit which is not responsive to said control means and having an adjustable volume control for adjusting the volume of an output audio signal independently of said control means.

2. A radio communication apparatus as claimed in claim 1, further comprising a selected terminal unit, said selected terminal unit comprising manually adjusting means for manually adjusting said adjusted signal to produce a manually adjusted signal and announcing means coupled to said manually adjusting means for providing an audio signal in accordance with said manually adjusted signal, and further wherein said control means of the apparatus comprises control means coupled to said detecting means and the first-mentioned adjusting means for controlling said adjusting means to make said selected level of the adjusted signal be constant.

3. A radio communication apparatus as claimed in claim 1, further comprising the selected terminal unit, said selected terminal unit comprising manually operating means for controlling the level of said audio signal, and further wherein said control means of said apparatus is coupled further to said manually operating means for controlling said adjusting means to adjust said selected level of the adjusted signal in accordance with said type signal and said audio signal.

4. A radio communication apparatus, for use in combination with a selected terminal unit, the selected terminal unit being selected from a plurality of terminal units of different kinds, the selected terminal unit being a selected kind, said radio communication apparatus including receiving means for receiving a radio signal to produce a received signal and adjusting means for adjusting said received signal to produce an adjusted signal, said radio communication apparatus comprising:
  detecting means for detecting the kind of said selected terminal unit from among the different kinds and for producing a type signal representative of the selected kind; and
  control means coupled to said adjusting means and said detecting means for controlling said adjusting means to make said adjusted signal have a selected level which is appropriate for said selected terminal unit in accordance with said type signal, said selected terminal unit comprising one of a hands-free terminal unit, a terminal unit having a control unit responsive to said control means and further being responsive to a manually operated volume control and a terminal unit which is not responsive to said control means and having an adjustable volume control for adjusting the volume of an output audio signal independently of said control means;
  said radio communication apparatus comprising a first and a second unit;
  said first unit comprising said receiving means, said adjusting means, said detecting means, said control means, and announcing means coupled to said adjusting means for providing an audio signal in response to said adjusted signal;
  said second unit being removably coupled to said first unit and being provided for coupling said selected terminal unit to said first unit.

5. A radio communication apparatus as claimed in claim 2, further comprising a main and a subsidiary antenna, wherein said receiving means is coupled to said subsidiary antenna, said second unit being removably coupled to said main antenna.

6. A radio communication apparatus as claimed in claim 4, wherein said second unit is removably coupled to at least said adjusting means, said detecting means and said control means of said first unit.

7. A radio communication apparatus as claimed in claim 6, wherein said second unit is removably further coupled to said receiving means, said first unit comprising an antenna selecting switch coupled to said receiving means for selecting one of said main and said subsidiary antennae as a selected antenna and for coupling said selected antenna to said receiving means.

8. A radio communication apparatus as claimed in claim 4, further comprising additional detecting means for detecting connection between said first and said second units to produce a connection detection signal, and wherein:
  said second unit comprises:
  coupling means for coupling said selected terminal unit to said receiving means; and
  main talk signal producing means coupled to said coupling means for producing a main talk signal;
  said first unit further comprising:
  subsidiary talk signal producing means coupled to said receiving means for producing a subsidiary talk signal; and
  selecting means coupled to said additional detecting means for selecting one of said main and said subsidiary producing means in accordance with said connection detection signal.

9. A radio communication apparatus as claimed in claim 8, wherein said additional detecting means comprises:
  generating means in said second unit for generating a magnetic field;
  local producing means in said first unit for producing a local signal when said local producing means is placed in said magnetic field; and
  processing means coupled to said local producing and said selecting means for processing said local signal into said connection detection signal.

10. A radio communication apparatus comprising:
  at least one terminal unit selected from a plurality of terminal units of different types, said selected terminal unit being of a selected type;
  receiving means for receiving a radio signal and for producing a received signal;
  adjusting means for adjusting the level of the received signal to produce an adjusted signal;
  means coupled to said selected terminal unit for determining the type of said selected terminal unit from among the different types and for producing a type signal representative of the type of said selected terminal unit; and
  control means coupled to said adjusting means and said determining means for controlling said adjusting means such that said adjusted signal has a level selected in accordance with said type signal, the selected terminal unit comprising one of a hands-free terminal unit, a terminal unit having a control unit responsive to said control means and further being responsive to a manually operated volume control and a terminal unit which is not responsive to said control means and having an adjustable volume control for adjusting the volume of an output audio signal independently of said control means.

11. A radio communication apparatus as claimed in claim 10, further comprising the selected terminal unit, said selected terminal unit comprising manually adjusting means for manually adjusting said adjusted signal to produce a manually adjusted signal and announcing means coupled to said manually adjusting means for providing an audio signal in accordance with said manually adjusted signal, and further wherein said control means comprises means coupled to said means for determining and the first-mentioned adjusting means for controlling said first-mentioned adjusting means to make said selected level of the adjusted signal be constant.

12. A radio communication apparatus, comprising:
at least one terminal unit selected from a plurality of terminal units of different types, said selected terminal unit being of a selected type;
receiving means for receiving a radio signal and for producing a received signal;
adjusting means for adjusting the level of the received signal to produce an adjusted signal;
means coupled to said selected terminal unit for determining the type of said selected terminal unit from among the different types and for producing a type signal representative of the type of said selected terminal unit; and
control means coupled to said adjusting means and said determining means for controlling said adjusting means such that said adjusted signal has a level selected in accordance with said type signal, the selected terminal unit comprising one of a hands-free terminal unit, a terminal unit having a control unit responsive to said control means and further being responsive to a manually operated volume control and a terminal unit which is not responsive to said control means and having an adjustable volume control for adjusting the volume of an output audio signal independently of said control means; and further wherein the apparatus comprises first and second units, and wherein:
said receiving means, said adjusting means, said determining means and said control means are provided in the first unit, and further comprising audio signal producing means in the first unit coupled to said adjusting means for providing said audio signal in response to said adjusted signal; and
said second unit comprising a unit removably coupled to said first unit, said second unit comprising means for coupling the selected terminal unit to said first unit.

13. A radio communication apparatus as claimed in claim 12, further comprising a main and a subsidiary antenna, and wherein the receiving means is coupled to the subsidiary antenna, the second unit being removably coupled to the main antenna.

14. A radio communication apparatus as claimed in claim 12, wherein said second unit is further removably coupled to said receiving means, said first unit comprising an antenna selecting switch coupled to said receiving means for selecting one of said main and said subsidiary antennae as a selected antenna and for coupling said selected antenna to said receiving means.

15. A radio communication apparatus as claimed in claim 12, further comprising detecting means for detecting connection between said first and said second units to produce a connection detection signal, and wherein:
said second unit comprises:
coupling means for coupling said selected terminal unit to said receiving means; and
main talk signal producing means coupled to said coupling means for producing a main talk signal;
said first unit further comprising:
subsidiary talk signal producing means coupled to said receiving means for producing a subsidiary talk signal; and
selecting means coupled to additional detecting means for selecting one of said main and said subsidiary producing means in accordance with said connection detection signal.

16. A radio communication apparatus as claimed in claim 15, wherein said detecting means comprises:
generating means in said second unit for generating a magnetic field;
local producing means in said first unit for producing a local signal when said local producing means is placed in said magnetic field; and
processing means coupled to said local producing and said selecting means for processing said local signal into said connection detection signal.

17. A radio communication apparatus as claimed in claim 12, further comprising the selected terminal unit, said selected terminal unit comprising manually operating means for controlling the level of said audio signal, and further wherein said control means is coupled further to said manually operating means for controlling said adjusting means to adjust said selected level of the adjusted signal in accordance with said type signal and said audio signal.

18. A method for controlling a radio communication apparatus coupled to at least one terminal unit selected from a plurality of terminal units of different types, said terminal unit being of a selected type, the method comprising the steps of:
receiving a radio signal and producing a received signal;
adjusting the level of the received signal to produce an adjusted signal;
determining the type of said terminal unit from among the different types and producing a type signal representative of the type of said terminal unit; and
controlling said adjusting signal with a control means such that said adjusted signal has a level selected in accordance with said type signal, said step of determining comprising determining the type of said terminal unit from among a hands-free terminal unit, a terminal unit having a control unit responsive to the control means and further being responsive to a manually operated volume control, and a terminal unit which is not responsive to a control means and having an adjustable volume control for adjusting the volume of an output audio signal independently of said control means.

19. A method as claimed in claim 18, further comprising the steps of:
generating in said second unit a magnetic field;
producing a local signal when said first unit is placed in said magnetic field adjacent said second unit; and
processing said local signal into said connection detection signal.

20. A method as claimed in claim 18, further comprising manually adjusting said adjusted signal in said terminal unit to produce a manually adjusted signal and providing said audio signal in accordance with said manually adjusted signal, and further comprising making the selected level of the adjusted signal constant.

21. A method for controlling a radio communication apparatus coupled to at least one terminal unit selected from a plurality of terminal units of different types, said terminal unit being of a selected type, the method comprising the steps of:

receiving a radio signal and producing a received signal;

adjusting the level of the received signal to produce an adjusted signal;

determining the type of said terminal unit from among the different types and producing a type signal respective of the type of said terminal unit; and controlling said adjusting signal with a control means such that said adjusted signal has a level selected in accordance with said type signal, said step of determining comprising determining the type of said terminal unit from among a hands-free terminal unit, a terminal unit having a control unit responsive to the control means and further being responsive to a manually operated volume control, and a terminal unit which is not responsive to a control means and having an adjustable volume control for adjusting the volume of an output audio signal independently of said control means;

further comprising providing first and second units, and wherein:

said steps of receiving, adjusting, determining and controlling are performed in the first unit, and further comprising the step of providing in the first unit the audio signal in response to said adjusted signal; and further comprising providing the second unit removably coupled to said first unit, said second unit coupling the terminal unit to said first unit.

22. A method as claimed in claim 21, further comprising detecting connection between said first and second units to produce a connection detection signal, and further comprising:

coupling said selected terminal unit through said second unit to a receiving means in said first unit;

producing a main talk signal;

producing a subsidiary talk signal in said first unit; and selecting one of said main and said subsidiary talk signals in accordance with said connection detection signal.

* * * * *